United States Patent
Zhou et al.

(10) Patent No.: US 11,226,260 B2
(45) Date of Patent: Jan. 18, 2022

(54) TRI-AXIAL MOTION DECOUPLING PERIODIC STRUCTURE FOR SHAKING TABLE CONTAINER

(71) Applicant: Zhejiang University, Hangzhou (CN)

(72) Inventors: Yanguo Zhou, Hangzhou (CN); Peng Xia, Hangzhou (CN); Yunmin Chen, Hangzhou (CN); Daosheng Ling, Hangzhou (CN); Bo Huang, Hangzhou (CN); Jianqun Jiang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 357 days.

(21) Appl. No.: 16/333,789

(22) PCT Filed: Feb. 11, 2018

(86) PCT No.: PCT/CN2018/076334
§ 371 (c)(1),
(2) Date: Mar. 15, 2019

(87) PCT Pub. No.: WO2018/157734
PCT Pub. Date: Sep. 7, 2018

(65) Prior Publication Data
US 2019/0257713 A1  Aug. 22, 2019

(30) Foreign Application Priority Data
Feb. 28, 2017 (CN) .......................... 201710114970.8
Oct. 19, 2017 (CN) .......................... 201710980557.X

(51) Int. Cl.
*G01M 7/06* (2006.01)
(52) U.S. Cl.
CPC ..................................... *G01M 7/06* (2013.01)
(58) Field of Classification Search
None
See application file for complete search history.

(56) References Cited

U.S. PATENT DOCUMENTS

| | | | | |
|---|---|---|---|---|
| 4,602,555 A | * | 7/1986 | Bushey | B06B 1/18 108/20 |
| 6,263,293 B1 | * | 7/2001 | Scott | G01M 7/06 702/113 |
| 2003/0172739 A1 | * | 9/2003 | Horiuchi | G01M 7/025 73/662 |

FOREIGN PATENT DOCUMENTS

| | | |
|---|---|---|
| CN | 201173884 Y | 12/2008 |
| CN | 201974280 U | 9/2011 |

(Continued)

*Primary Examiner* — Alexander A Mercado

(57) ABSTRACT

Provided is a three-directional motion decoupling periodic structure for a shaking table container. The periodic structure is formed by sequentially superimposing n periodic structure units, wherein each of the periodic structure units is formed by sequentially superimposing a first side-confining layer, a planar decoupling layer, a second side-confining layer and an elastic layer, wherein n is a positive integer greater than or equal to 2; the cross-sectional shapes of the first side-confining layer, the elastic layer, the second side-confining layer and the planar decoupling layer are the same; and the periodic structure is used for implementing three-directional motion decoupling in the operating condition of ground shaking. Further provided is a three-directional motion decoupling container for shaking table test, which is formed by combining the periodic structure, a container base plate and a position-limiting protection door-type frame (3). The container, which is light in weight and high in strength, is applicable to the shaking table tests at hypergravity and normal gravity. Multiple measures are taken to ensure the motion synchronization between the container and tested soil, the non-interference of the motions of the container and the tested soil in the three directions of X, Y and Z, no extra acting force being exerted on the tested soil by the container, and the avoidance of a boundary effect as much as possible, (Continued)

so as to fully realize the three-directional decoupling and reconstitute original site characteristics.

16 Claims, 4 Drawing Sheets

(56) References Cited

FOREIGN PATENT DOCUMENTS

| | | |
|---|---|---|
| CN | 102323138 A | 1/2012 |
| CN | 102494957 A | 6/2012 |
| CN | 204286919 U | 4/2015 |
| CN | 204389133 U | 6/2015 |

* cited by examiner

TRI-AXIAL MOTION DECOUPLING PERIODIC STRUCTURE FOR SHAKING TABLE CONTAINER

CROSS REFERENCE TO RELATED APPLICATION

This application is a national stage application of International application number PCT/CN2018/076334, filed Feb. 11, 2018, titled "TRI-AXIAL MOTION DECOUPLING PERIODIC STRUCTURE FOR SHAKING TABLE CONTAINER," which claims the priority benefit of Chinese Patent Application Nos. 201710114970.8 and 201710980557.X, filed on Feb. 28, 2017 and Oct. 19, 2017, respectively, the disclosure of which are hereby incorporated by reference in entirety.

TECHNICAL FIELD

The present disclosure involves a field of civil engineering, in particular to a tri-axial motion decoupling periodic structure for shaking table container, including the tri-axial motion decoupling shaking table container made of aforementioned periodic structure and its use, and the said container is designed in particular for centrifuge shaking table.

BACKGROUND

In the field of civil engineering, observation and prediction are routinely used to understand the behavior of civil engineering objects, evaluate its service performance and safety, and adopt corresponding countermeasures. Observation mainly refers to prototype observation, i.e., usually utilizing embedded measuring sensors to get information of the engineering structure's performance directly after the completion of the civil engineering construction. This kind of study is an ex-post study and cannot guide the structure's design in advance. There are two kinds of prediction methods, one is numerical analysis, the other is physical modelling, which can reasonably set and control the boundary conditions according to the similarity law and prototype conditions (for example, real building condition). Thus, the force conditions of hypothetical design loads can be modeled, and the mechanical response and working behavior of engineering structure under conditions of various combined factors can be predicted or reproduced, and even the whole process of destruction can be modeled. The information obtained from physical modelling is marked by foresightedness, which can provide technical basis or information for design and can also be used to verify the results of numerical analysis.

At present, the commonly used methods of geotechnical physical simulation or geotechnical physical modelling are as follows: 1 g small scale model test, 1 g large scale model test, calibration tube test, 1 g shaking table test, centrifuge shaking table test (also called hypergravity centrifuge shaking table test), in which 1 g represents constant gravity.

The simulation of structure's seismic performance is of great importance in geotechnical physical modelling test. Generally, those earthquakes that cause serious hazards to human life is shallow source earthquake, whose shaking depth is less than 60 km, of which 5~20 km is the common depth. In an effort to reduce earthquake damages and research the seismic performance of engineering structure, people usually use shaking table test, that is, placing the scaled model of engineering structure on the shaking table, then inputting seismic waves, the seismic responses of engineering structure can be observed, the seismic performance of real building structure can then be predicted. The shaking table test can be divided into two kinds: constant gravity shaking table test and centrifuge shaking table test, in other words, 1 g shaking table test and hypergravity shaking table test.

1 g shaking table test is mainly used to model the seismic response of engineering structure. This kind of simulation method has some advantages over others, and 1 g shaking table's size and capacity are getting larger. The advantages of 1 g shaking table test are as follows: it can be used for the simulation of ground motion, scaling of the seismic frequency is not necessary, the maximum degree of freedom is 6, and the interaction between test soil and experimental structure can be modeled. The defects of 1 g shaking table test are as follows: more attention is paid to area than depth, the ground surface stress is incorrect, the boundary has wave reflection, and the earthquake near the scene cannot be well modeled. The constant gravity shaking table is usually large shaking table without centrifuge, of which the table size is very large.

The centrifuge test is conducted with the help of centrifuge, and the scaled geotechnical model is placed in centrifuge with high rotation speed, so that the model can undergo the effects of hypergravity acceleration which can compensate the deadweight loss of geotechnical materials resulting from model scaling. In centrifuge test, the geotechnical model rotates at a constant angular velocity $\omega$, providing a centrifugal acceleration equal to $r\omega^2$ (r refers to the distance between testing model and the rotation center). If the scaled model uses the same soil as the prototype site (real site), then when the centrifugal acceleration is N times the gravity acceleration ($Ng=r\omega^2$), then the scaled model at a depth of $h_m$ will have the same vertical stress as the prototype site at a depth of $h_p=Nh_m$, that is $\sigma_m=\sigma_p$. This is the basic similarity law of centrifuge test. When the geotechnical model with size reduced by N times is subjected to hypergravity acceleration of N times of the gravity acceleration, the stress of scaled geotechnical model is consistent with the stress of prototype site, that is the scale effect of centrifuge test. For example, when N=10, it means the centrifugal acceleration equals 10 g, so the scaled model at a depth of 1 m will have same vertical stress as prototype site at a depth of 10 m. When N=100, it means the centrifugal acceleration equals 100 g, so the scaled model at a depth of 1 m will have same vertical stress as prototype site at a depth of 100 m. So the scale effect can be achieved by enlarging the centrifugal acceleration by N times of the gravity acceleration. The advantages of centrifuge test are as follows: it can correctly model the real stress of geomaterials with the change of depth, the test soil can be chosen, the stress history of test soil can be designed, loading system is controllable, the cost is relatively lower and the time is less, the deformation and failure mechanism can be observed.

The centrifuge shaking table test combines two equipment, the shaking table and the centrifuge, the scaled geotechnical model is placed in the container while the container is placed on the shaking table. Guided by the principle of aforementioned centrifuge test, when the centrifugal acceleration reaches the required Ng (Ng means N times of gravity acceleration, N is centrifugal acceleration factor and N≥1), the shaking table is operated and input the required seismic wave, then the response of geotechnical structure under corresponding seismic conditions can be obtained, that is, the seismic performance of geotechnical structure can be obtained. The centrifuge shaking table is usually a small shaking table (the shaking table's size is relatively small) and is operated with the help of a centrifuge.

The depth of common engineering sites is dozens to hundreds of meters, and when shaking table are used to model the impact of ground motion on the sites and geotechnical structure, the full scale test would be the most ideal test, in other words, the soil model which has a depth of dozens to hundreds of meters should be placed on the shaking table, and use the shaking table to input trial-axial (X, Y, Z directions) seismic waves, then the impact of ground motion on the prototype sites can be truly reflected. However, with the limitations of shaking capacity and sizes of shaking table, the full-scale test is not realistic in laboratory test. The height of containers used in constant gravity shaking table test is usually 2~3 m, that is to say, in constant gravity shaking table test, the prototype sites are modeled by the scaled model with depth of 2~3 meters. If the scaled model is used to model a certain depth of prototype site, then the height of the model will equate to prototype depth, and the length scale factor n equals to the prototype depth divided by the model height (for example, using a scaled model with height of 1 m to model a prototype site with depth of 100 m, factor n=100/1=100). According to similarity laws (dimensional analysis) of constant gravity shaking table, the relationship between prototype site seismic responses and model seismic responses can be obtained as follows: the acceleration factor is 1, the displacement factor is n, and the velocity factor is $n^{1/2}$. For example, when n=100, the acceleration measured by model test can be directly used for prototype sites, the displacements measured by model test need to be magnified by 100 times for prototype sites, the velocities measured by the model test need to be magnified by 10 times for prototype sites. Therefore, the constant gravity shaking table experiments will cause seismic responses of the geomaterials to be seriously distorted, of which the stress-strain relationship is inaccurate, thus the mechanical properties of prototype sites cannot be modeled factually. Therefore, only by using centrifuge shaking table test, the prototype gravity field can be reconstructed by centrifugal force, and the stress-strain relationship of prototype soil can be reproduced, for example, when the centrifugal acceleration is Ng=100 g, a scale model with depth of 1 m can model the prototype site with depth of 100 m.

Containers are necessary special test devices in shaking table test, whose structures, shapes and sizes are often determined according to different requirements of actual test. Containers can be divided into rigid containers and flexible containers. Rigid containers are mainly used for static testing, while flexible containers (also known as shear boxes or shear containers) are mainly used for seismic modelling. To date, the containers used in shaking table test can be divided into constant gravity (1 g) shaking table containers and centrifuge shaking table containers according to operating conditions. Constant gravity shaking table containers are usually made of large, heavy, hard materials (for example, steel), while centrifuge shaking table containers are usually made of light-weight and high-strength materials (for example, aluminum alloy). The containers designed for constant gravity shaking table cannot be used in centrifuge shaking table, but the containers designed for the centrifuge shaking table can be used in constant gravity shaking table.

Practically, the foundation soil can be considered as a semi-infinite space site, but in shaking table model test, only the finite-sized container can be used to load the test soil for shaking table test. The soil stress in containers can be used to model the stress of prototype site soil, therefore, the container used for shaking table must meet the basic requirements of four points. 1) During the process of vibration, the transfer of shear wave velocity or shear stress shouldn't be affected by the container. The shear stiffness in horizontal direction should be close to zero, and the container should have no effect on deformation of the test soil. 2) The size of the horizontal section of the container should remain unchanged during the vibration process. 3) The side wall of the container should have enough rigidity. 4) The wall mass of the container should be lightened as far as possible to reduce the lateral passive earth pressure. At present, a large number of containers have used in 1 g shaking table test or centrifuge shaking table test by researchers. In reality, the forces acted by earthquake on geotechnical sites are three-dimensional (X, Y, Z directions), so the input seismic waves in shaking table test should be three-dimensional that prototype conditions can be accurately modeled (real seismic forces acting on the prototype sites). Theoretically, it is necessary to realize the three-dimensional vibration of the test soil in order to accurately model the seismic response of the prototype sites (real sites). In model test, the seismic response of prototype sites can't be obtained if the seismic motions induced by shaking table are directly applied to loose soil without boundaries. Therefore, a device (container) is needed to load loose soil and provide boundaries. The vertical forces exerted by shaking table are transmitted to upper layers through upward pressure of the bottom layer, and the horizontal forces are transmitted through horizontal shear stress to upper layers. In other words, these forces are not transmitted through the container. Therefore, the container is mainly used for the lateral confinement. Lateral confinement means separating a small block from the semi-infinite space without influencing or breaking mechanical requirements of the semi-infinite space. Besides, the container is outside the geotechnical model. Even though the lateral confinement conditions are satisfied, the container shouldn't interfere with the deformation of geotechnical model when being applied with dynamic loads. Thus, the container shouldn't have any constraints on the deformation of the test soil, so it is necessary to realize tri-axial (X, Y, Z directions) motion decoupling of the container to ensure motion coordination between the container and the model. Motion coordination should satisfy the following four conditions: synchronous motion between the model and the container, non-interference in motion between the model and the container in X, Y, Z directions, no additional force produced by the container to the test soil, avoiding boundary effects as far as possible. If one of the above four conditions is not satisfied, it will result in motion incoordination.

Synchronous motion between the test soil and the container means that the test soil can move along with the container in X, Y, Z directions, and the test soil and the container can move simultaneously in X, Y, Z directions without relative motions. Non-interference in motion between the model and the container in X, Y, Z directions means that the deformation in one of the three directions will not influence deformation in other two directions. For example, the deformation theoretically is 10 mm in X direction, 9 mm in Y direction, 2 mm in Z direction, but in real shaking deformation, it turns out to be 9 mm in X direction, 8 mm in Y direction, 3.2 mm in Z direction, so in this case, the formation of interference is that the energy to induce deformation in X and Y directions is absorbed by deformation in Z direction. Again for example, the deformation theoretically is 10 mm in X direction, 9 mm in Y direction, 2 mm in Z direction, but in real shaking deformation, it turns out to be 11 mm in X direction, 10 mm in Y direction, 1.8 mm in Z direction, so in this case, the formation of interference is that the energy to induce deformation in Z direction is absorbed by deformation in X and Y directions. Again for example, the deformation theoretically is 10 mm in X direction, 9 mm in Y direction, 2 mm in Z direction, but in real shaking deformation, it turns out to be 12 mm in X direction, 8 mm in Y direction, 1.8 mm in Z direction, so in this case, the formation of interference is that the energy to induce deformation in Y and Z directions is absorbed by deformation in X direction. In summary, non-interference in motions between the test soil and the container in X, Y, Z directions means that the deformation in one of the three directions will not influence the test soil's deformation in any direction or the other two directions. For example, the deformation in X direction will not influence the deformation in Y and Z directions or the deformation in any direction of X, Y, Z directions.

No additional force produced by the container to the test soil means that the container will not limit the test soil's deformation during the process of dynamic deformation of the model and the container. Due to the fact that soil is naturally loose, when being placed into a fixed-shaped container, the container will exert additional forces on the test soil. For example, friction between the container's two adjacent layers will hinder the relative motion of the adjacent two layers, thereby the deformation of the test soil is limited in some extent and the test results is influenced. Boundary effects mean that the frictional influence on side walls of the container will change the stress condition and deformation condition of the boundary. The boundary is the contact part of the test soil with the container. That is, there are many uncertainties in centrifuge shaking table test used to model the prototype site conditions. It is common practice to increase the container's size to reduce boundary effects in constant gravity (1 g) shaking table test. But limited by centrifuge capacity (centrifugal acceleration times payloads), it is almost impossible to increase the container's size to weaken boundary effects in the centrifuge shaking table test. Because boundary effects are unavoidable and centrifuge shaking table test mainly use scaled models to model prototype site conditions, so we need to avoid boundary effects or minimize boundary effects in order to model prototype site conditions accurately as far as possible.

Current technology improvements on motion coordination are limited, only one or two factors are considered. For example, improvements to reduce boundary effects are considered while the other three factors affecting motion coordination are not considered. In other words, no comprehensive improvements have been achieved. Current improvements on motion incoordination are not effective enough to satisfy experimental requirements. In shaking table test, the four factors which affect motion coordination will produce corresponding deviation respectively, and all the four kinds of deviations will be superimposed and magnified due to the scale effects produced by centrifuge. The larger the centrifugal acceleration (N) is, the larger the deviation magnifications will be. For example, displacement and motion acceleration deviations are magnified by N times, soil consolidation time deviation is magnified by N2 times, and energy deviation is magnified by N3 times. So it is necessary to solve the problem of motion incoordination in containers in an effort to truly reflect actual site responses and provide real and objective basis for geotechnical engineering structure designs. Actually, it is very difficult to achieve motion coordination between the container and the test soil in both constant gravity and centrifuge shaking table test. If the motion coordination between the container and the model is not realized, then the simulation results will be inaccurate, which turns out to be too large or too small compared to the actual responses. If the modeled responses are larger than the actual ones, then the assessments of site conditions will be too conservative to cause economic waste in designing, while the modeled responses are smaller than the actual ones, then the assessments of site conditions will be too extreme to cause insecurity in designing.

In centrifuge shaking table test with rigid containers or poor tri-axial motion decoupling containers, if tri-axial (X, Y, Z directions) seismic accelerations are input from the shaking table are 1.0 m/s$^2$, then the boundary conditions will affect seismic wave propagation and reflection to a great extent, resulting in interference. For example, the seismic wave propagating in X direction will impact the walls of the container, bounce into Y and Z directions to continue propagating, causing superposition of seismic waves in Y and Z directions, which in turn inflates earthquake wave in Y and Z directions. One consequence may be that the acceleration in X direction turns out to be 0.8 m/s$^2$, and the accelerations in Y and Z directions turn out to be 1.2 m/s$^2$, so we can see that the simulation results is seriously distorted, which affects the prototype site assessments significantly.

The motion incoordination will seriously affect the shaking table test results, which will introduce large deviations between the simulation results and the prototype site responses. So it is necessary to decouple the tri-axial motions of the container to maximally restore prototype sites' real responses for guiding practical engineering construction. The motion incoordination includes any of the four conditions: asynchronous motions between the container and the model, the interference in X, Y, Z directions' motions between the container and the model, the additional force produced by the container to the test soil and boundary effects.

The state-of-the-art tri-axial motion decoupling technique is only realized for constant gravity shaking table, which separate X, Y, Z three directions' motion directly by shaking table, so that the shaking forces provided by shaking table are independent in X, Y, Z three directions. The main principle of tri-axial motion decoupling is the mechanical principle, namely by mechanical linkage devices or hydraulic devices. For example, Chinese patent CN202793722U discloses a plane static pressure vibration transmission decoupling device and tri-axial vibration composite table. The plane static pressure vibration transmission decoupling device consists of sliding blocks and sliding seat via slide connection, which is provided with sliding gap in the sliding surface. High-pressure oil is injected into the sliding gap through oil channel to form hydrostatic oil film. Because the hydrostatic oil film has good rigidity under high oil pressure and does not hinder the sliding between the slide blocks and the sliding seat. When the coaxial vibration generator emits high-frequency vibration and thrust, which are transmitted by vertical hydrostatic oil film, and when the off-axial vibration generator emits high frequency vibration and thrust, the decoupling is realized by the sliding between the slide blocks and the sliding seat, thus achieving the goal of lossless transmission and effective decoupling of vibration.

The state-of-the-art tri-axial motion decoupling technique has not been realized for shaking table containers (containing test soil), not to mention centrifuge shaking table containers. In shaking table test, current technology improvements on motion coordination are limited, only one or two factors are considered. For example, improvements to reduce boundary effects are considered while the other three factors affecting motion coordination are not considered. In summary, no comprehensive improvements have been achieved, that is, current improvements on motion coordination are not effective enough to satisfy experimental requirements. Chinese patent CN102323138, CN102494957A, CN202362464U use ball bearings (as shown in FIG. 7) or rollers to realize coordinated motion between the container and the test soil, which can only carry out uni-axial motion due to the restricted motion of ball bearings or rollers. That is, the container cannot move freely in the horizontal plane, thus it can only be used for uni-axial shaking table test. The shear model container shown in Chinese patent CN105675239A and CN204286919U is mainly improved by reducing the friction between the roller and the aluminum ring and optimizing the performance of uni-axial shaking table containers, thus the container can deform freely with the test soil during the uni-axial vibration. The adopted improvement is placing ball bearings in strip grooves or guide chutes. The ball bearings can only move uni-axial freely in strip grooves or the guide chutes, and the friction will be smaller because of the small contact surface. Chinese patent CN204286731U makes the slider move freely on the linear guide to realize uni-axial free vibration of the test soil and the container. Chinese patent CN204389133U makes the dumbbell type pulley sliding uni-axial in the slideway to realize free vibration of the test soil and the container. The container disclosed by Chinese patent CN204405424U is used in large-scale shaking table test (constant gravity shaking table test), which also makes the pulley sliding uni-axially in the slideway to achieve coordinated motion, so it can only model uni-axial vibration. Chinese patent CN204924601U uses deep groove ball bearings to realize the horizontal uni-axial motion of the container. In summary, the above-mentioned technologies can only be used in the uni-axial shaking table test, not in the bi-axial shaking table test or in the tri-axial shaking table test.

Chinese patent CN103940977A uses prestress to eliminate the influence of side wall effects, specifically by adjusting the prestress value of the cable. But there are some problems unsolved: the prestressing force will influence the horizontal stiffness of the container, that is, after the vertical prestressing, the horizontal direction is difficult to deform with deformation of the test soil. The vertical stiffness of the container is consistent with the vertical stiffness of the test soil due to prestressing, but the vertical stiffness of the test soil is changeable, so this method has large deviations in simulating boundary conditions. Besides, the technology of prestressing is relatively cumbersome, and the precision is difficult to control.

The tri-axial shear container described by Chinese patent CN104865033A can realize free motions in three directions when subjected to tri-axial seismic motions. But only improvement to reduce boundary effects are considered, while the other three factors affecting motion coordination are not considered. For example, the effect of vertical stiffness on soil deformation is not considered. In other words, no comprehensive improvements have been achieved and the problem of tri-axial motion decoupling is not considered, which caused many deviations in test by this kind of containers. In addition, this kind of containers is only suitable for constant gravity shaking table test, because only when the container's size is large enough that the effect of vertical stiffness can be neglected. So the so-called "tri-axial" shear container can only be applied to bi-axial shaking table test.

Chinese patent CN105738196A describes a vertical loading multi-layer shear container used for large shaking table (constant gravity shaking table), and the container can realize bi-axial vibration (X, Z directions), but cannot realize the tri-axial motion decoupling under the condition of centrifuge test.

Chinese patent CN201974280U discloses a stacked bi-axial shear container for large underground structure's shaking table test. It is actually a container for constant gravity shaking table test. Each stacked frame of the container is evenly arranged with more than three sliding columns, and the end of the sliding column is embedded with ball bearings. A circular chute with a rounded edge is arranged on the lower stacked frame corresponding to the sliding column, and ball bearings in the sliding groove can move circularly. Each stacked frame is connected by a sliding device, which ensures the independence and relativity of the structure motion of the layered container. So the container adapts only to uni-axial or bi-axial ground motion inputs, and cannot be used for tri-axial seismic motion inputs, not to mention the realization of tri-axial motion decoupling.

Due to earthquake's devastating impact on human life, it is necessary to carry out research of the impact of earthquake on geotechnical structure in prototype sites. Shallow earthquakes have the most destructive impact on geotechnical structure, of which the depth are generally more than 5 km. So constant gravity shaking table and shear containers can't be used to model seismic responses of prototype sites, it is the centrifuge shaking table that can be used to model responses of prototype sites. In model test, it is commonly believed that the geomaterials' accurate response is an important factor for designing and evaluating security of the soil-structure system. Because the real ground motion is tri-axial (X, Y, Z directions), it is necessary to model real working conditions by inputting trial-axial seismic motions, which cannot be realized by present bi-axial or uni-axial shaking table. Therefore, in order to improve the accuracy of the dynamic test, tri-axial motion decoupling is essential for the containers used in the centrifuge shaking table. But the state-of-the-art technology has yet to achieve these requirements.

SUMMARY

Aimed at overcoming shortages of existing technologies and the technical problems, the present disclosure provides a tri-axial motion decoupling periodic structure for shaking table containers, the tri-axial motion decoupling shaking table container made of afore mentioned periodic structure and its use. The periodic structure disclosed can be used to realize tri-axial motion decoupling of constant gravity shaking table containers and the centrifuge ones, especially suitable for centrifuge shaking table containers.

The technical solution is as follows:

The present disclosure provides a tri-axial motion decoupling periodic structure for shaking table containers and said periodic structure is stacked (superimposed) together by n periodic structure units, and the periodic structure unit is formed orderly by superposition of a first side-confining layer, a planar decoupling layer, a second side-confining layer and an elastic layer, and n is a positive integer greater than or equal to 2. The first side-confining layer's cross-sectional shape is same as the elastic layer, the second side-confining layer and the planar decoupling layer, while the material of the first side-confining layer and the second side-confining layer can be same or different. So the periodic structure can be used to realize or implement tri-axial motion decoupling under the earthquake motion conditions The planar decoupling layer comprises a plurality of symmetric distributed decoupling units, and a decoupling unit comprises decoupling components, lubricating grease and a circular groove, wherein the circular groove is used to realize free motion of decoupling components and limit maximum horizontal displacement. The decoupling components and lubricating grease can realize synchronous motion between the container and the test soil, and the decoupling unit can realize non-interference of the periodic structure unit's horizontal motions. The plurality of symmetric distributed decoupling units can realize horizontal vibration decoupling and ensure consistency of the interlayer shear strain between periodic structure units.

The motion of any object can be decomposed into three directions, that is, the motions along horizontal directions (X, Y directions) and the motion along vertical direction (Z direction). The displacements of any object can be combined with the vector superposition of motions along three directions. The key point of horizontal decoupling is to allow the container to move freely with the test soil in horizontal plane, that is, the container's shear strength along the horizontal direction should be very low, and optimally the shear strength equals to zero. Therefore, the inventor sets the planar decoupling layer as the jointing element between the first side-confining layer and the second side-confining layer. Because of the rolling friction between the planar decoupling layer and the two side-confining layers as well as the lubricating grease contained in the plane decoupling layer, the horizontal shear strength of the container approximately equals to zero. Thus, the container does not produce additional force to the test soil. The lubricating grease can be silicone oil.

In planar decoupling layer, the decoupling components' horizontal displacement can be limited by setting up a plurality of circular grooves with symmetrical distributions at the first and second side-confining layers respectively. The decoupling components are then placed in the middle of the circular groove, and the quantity of decoupled units in each circular groove can be one or more, preferably 3. The quantity of circular grooves is at least 3, and the optimal quantity is 12. This method is able to not only realize horizontal vibration decoupling, but also confer great stability and a certain degree of security due to the restrictions of lateral limit layers in horizontal displacements. Preferably, the decoupling components are circular shape. Preferably, the decoupling components is ball bearings. Further, the decoupling components are steel ball bearings or stainless ball bearings. The dimensions of circular grooves and decoupling components can be determined according to the maximum shear deformation: $\gamma_{max}=(R-r)/\Delta H$, wherein R is the radius of the circular grooves, r is the radius of the decoupling components, and $\Delta H$ is the distance between the centers of two adjacent periodic structures' elastic layers, $\gamma_{max}$ is the maximum shear deformation of test soil at the periodic structure.

The elastic layer is used to change the vertical stiffness of the container and to realize synchronous vertical motion between the container and the test soil.

The planar decoupling layer and the elastic layer are combined synergistically to realize the decoupling of vertical and horizontal motions of the container and the test soil.

The decoupling units of each periodic structure unit's planar decoupling layer can be same or different.

In some embodiments, the material density of the side-confining layer is less than or equal to 7.85 g/cm$^3$, and the elastic modulus of the side-confining layer is greater than or equal to 40 kN/mm$^2$. Preferably, the material of the side-confining layer is aluminum alloy.

In some embodiments, the side-confining layer is a metal ring, preferably, the metal ring is an aluminum alloy ring.

The material of the side-confining layer shall have the properties of light and high strength. So the side-confining layer can not only provide supporting boundaries for the test soil but also can reduce deformation of the container, which is caused by the test soil pressure and the influence of container's vibration inertia, so that the influence produced by container's vibration on soil response can be avoided. Therefore, the material density of the side-confining layer is less than or equal to 7.85 g/cm$^3$ and the elastic modulus is greater than or equal to 40 kN/mm$^2$.

Ideally, the lateral limit layers should be subjected to axial forces produced by the test soil and bear less bending moments, so as to reduce the disturbance of test soil caused by bending deformation of the lateral limit layers. Therefore, the shape of the side-confining layers is circular or regular polygon, preferably, the number of regular polygon's edges is greater than or equal to 2 m, wherein m is a positive integer and m is greater than or equal to 4, more preferably, the number of the regular polygon's edges equals to 12.

In some embodiments, the elastic layer needs to determine the material selection according to elastic modulus of the test soil. The main function of elastic layer is to ensure synergetic vertical motion of the test soil and the container. The trial-axial shaking table container is stacked by periodic structures. Each periodic structure is stacked (superimposed) orderly together by n periodic structure units, and the periodic structure unit is formed orderly by superposition of the first side-confining layer, the planar decoupling layer, the second side-confining layer and the elastic layer. Even though the test soil (model foundation soil) has uniform density, the self weight stress and stiffness of the test soil are increased from top to bottom. In order to realize synergetic deformation between the test soil and the container, vertical strain of the test soil and the container must be same, mainly by controlling the vertical elastic modulus of the elastic layer. The key point to realize vertical deformation synchronization is as follows: $\overline{\varepsilon_{periodicstructure}}=\varepsilon_{test\ soil}$. As shown in FIG. 8, elastic modulus of the first side-confining layer is $E_1$ and height is $h_1$. Elastic modulus of the planar decoupling layer is $E_2$ and height is $h_2$. Elastic modulus of the second side-confining layer is $E_3$ and height is $h_3$. Elastic modulus of the elastic layer is $E_4$ and height is $h_4$. Compressive modulus of the test soil is E and the distance between upper boundary of the test soil and the elastic layer is h. The vertical stress linearly increases with the test soil's depth, and the vertical stress can be expressed as kh, where k is a linear coefficient. The strain of periodic structure $\overline{\varepsilon_{periodicstructure}}$ and the strain of test soil $\varepsilon_{test\ soil}$ satisfy the following formulas:

$$\overline{\varepsilon_{periodic\ structure}} = \int_{h}^{h+h_1} \frac{kh}{E_1}dh + \int_{h+h_1}^{h+h_1+h_2} \frac{kh}{E_2}dh + \int_{h+h_1+h_2}^{h+h_1+h_2+h_3} \frac{kh}{E_3}dh + \int_{h+h_1+h_2+h_3}^{h+h_1+h_2+h_3+h_4} \frac{kh}{E_3}dh$$

-continued $$\varepsilon_{test\ soil} = \int_{h}^{h+h_1+h_2+h_3+h_4} \frac{kh}{E} dh$$

$$\overline{\varepsilon_{periodic\ structure}} = \varepsilon_{test\ soil}$$

$$\overline{\varepsilon_{periodic\ structure}} = \int_{h}^{h+h_1} \frac{kh}{E_1} dh + \int_{h+h_1}^{h+h_1+h_2} \frac{kh}{E_2} dh +$$

$$\int_{h+h_1+h_2}^{h+h_1+h_2+h_3} \frac{kh}{E_3} dh + \int_{h+h_1+h_2+h_3}^{h+h_1+h_2+h_3+h_4} \frac{kh}{E_4} dh$$

$$\varepsilon_{test\ soil} = \int_{h}^{h+h_1+h_2+h_3+h_4} \frac{kh}{E} dh$$

$$\overline{\varepsilon_{periodic\ structure}} = \varepsilon_{test\ soil}$$

Based on aforementioned simple integral operations and deformation equality of the container and the test soil, the vertical elastic modulus of elastic layer can be calculated by the test soil's compressive modulus and elastic moduli of two lateral limit layers and the plane decoupling layer, so the material of elastic layer can be selected according to calculated elastic modulus. Because horizontal decoupling is realized by the plane decoupling layer, the elastic layer mainly plays the role of controlling vertical stiffness. Therefore, the anisotropic parameters of elastic layer should meet the following conditions: 1) the shear modulus of elastic layer in horizontal direction should be as small as possible, and optimally equals to 0, that is, the shear deformation of the test soil is not restrained by the container. 2) The elastic modulus of elastic layer in vertical direction should ensure synergetic deformation of the test soil and the container. The specific parameters can be deduced from the three formulas described above.

In some embodiments, the material of elastic layer is rubber.

In some embodiments, the material elastic modulus of decoupling components is greater than or equal to 160 kN/mm$^2$, preferably, the material of decoupling components is steel or stainless steel.

In some embodiments, the decoupling components are steel ball bearings or stainless-steel ball bearings.

In some embodiments, the cross-sectional shape of periodic structure is circular or regular polygon. The number of regular polygon's edges is greater than or equal to 2 m, wherein m is a positive integer and m is greater than or equal to 4, more preferably, the number of regular polygon's edges equals to 12. Cross-sectional shapes of the first side-confining layer, the elastic layer, the second side-confining layer and the planar decoupling layer are the same as the periodic structure's. Cross-sectional shape refers to the shape of overlook plane diagram of the shaking table container.

In some embodiments, the periodic structure unit comprises at least 2 limiting devices, wherein the limiting devices are used to realize vertical limit protection for planar decoupling layers, which can prevent vertical relative displacement of the first lateral limit layer and the second side-confining layer from being too large to separate.

In some embodiments, the limiting device is thin steel sheet with excess length. The first side-confining layer and the second side-confining layer should not be separated from each other during test, which can be realized by thin steel sheets with excess length fixed on the two side-confining layers (for example, fixed through bolts). So when the first side-confining layer and second side-confining layer are just separating from each other in vertical direction, and when decoupling components are just emerging from circular grooves, the thin steel sheets will be straightened to avoid decoupling component from rolling out of circular groove. Excess length l of the thin steel sheet can be determined by:

$$l = \max\{(R-r), (\Delta h' - \Delta h)\}$$

wherein, $\Delta h'$ is the distance between upper surface of circular grooves on the first side-confining layer and the lower surface of circular grooves on the second side-confining layer. $\Delta h$ is gap distance between the first side-confining layer and the second side-confining layer. R is the radius of circular grooves, and r is the radius of decoupling components. In order to be safer, excess length l of the thin steel sheet can be multiplied by certain safety factor for actual application. So the total length of the thin steel sheet can be obtained by adding calculated excess length to the distance between thin steel sheets' fixed points. The number of thin steel sheets can be relatively less, as arranged along regular polygon's intervals.

The periodic structure proposed by the disclosure can be used for tri-axial motion decoupling for constant gravity shaking table container or centrifuge shaking table container. Preferably, the periodic structure proposed by the disclosure is especially suitable for realizing tri-axial motion decoupling for centrifuge shaking table container. As public knowledge in this field, constant gravity shaking table container is usually made of large, heavy, hard material (for example, steel), while centrifuge shaking table container is usually made of light-weight and high-strength material (for example, aluminum alloy). The container designed for constant gravity shaking table cannot be used in centrifuge shaking table, but the container designed for centrifuge shaking table can be used in constant gravity shaking table.

In some embodiments, centrifugal acceleration N of the centrifuge shaking table should be greater than or equal to 20, preferably, N≥50, preferably, N≥100, preferably, N≥50.

The second purpose of the disclosure is to provide a tri-axial motion decoupling shaking table container, which comprises a bottom plate, auxiliary decoupling units, limiters, aforementioned periodic structures. The bottom plate is fixed on the shaking table, while the periodic structures are stacked on the bottom plate. The limiters are fixed around the periphery of periodic structures and connected with the bottom plate to form the limit protection for the container. The auxiliary decoupling units are used to reduce the influence of boundary effects on test results and to assist tri-axial motion decoupling under large soil deformation. The auxiliary decoupling units are located on the container's inner surface, of which the surfaces are contacted with the test soil and the container respectively. The container can be used for tri-axial motion decoupling of constant gravity shaking table test and centrifuge shaking table test.

In some embodiments, centrifugal acceleration N of the centrifuge shaking table should be greater than or equal to 20, preferably, N≥50, preferably, N≥100, preferably, N≥150.

In some embodiments, the auxiliary decoupling units are double layer rubber films, with lubricating grease filling the films. It will be hard to satisfy synergetic motion between the container and the test soil especially because of the following reasons: 1) the stress along the soil is not uniformly changed, 2) the test soil's modulus and strain are nonlinear, 3) the container's manufacture process is inaccurate. For example, the test soil's horizontal deformation would impact the container. Due to various reasons mentioned above, the horizontal synergetic motion and the non-interference between horizontal and vertical motions are difficult to realize. So the double layer rubber films can be used to complement decoupling, thus the vertical and horizontal motions can barely interfere with each other, which in turn keep motions synchronized. Lubricating grease is filled into double layer rubber films, whose outer sides are respectively attached to the container and the test soil by friction, so the double layer rubber films can be separated from each other, in other words, horizontal motion can be further separated from vertical motion. Therefore, double layer rubber films can serve as a supplementary measure to further release disturbance of horizontal deformation to vertical deformation. The lubricating grease can be silicone oil.

In some embodiments, the cross-sectional shape of the container is circular or regular polygon, and the number of regular polygon's edges is greater than or equal to 2 m, wherein m is a positive integer, m≥4.

In some embodiments, the limiters are door type frames, wherein door frames are detachable, preferably, the door frames are cross shaped ones. Ideally, the container will deform with the test soil's deformation, which is relatively small. For safety and to ensure performance of the container, the limiters are needed to be set to ensure safety. The container is provided with door frame limiters, which are detachable, that is, the limiters can be removed from the container bottom plate at model preparation stage for convenience, and can be fixed again before model test. The upper and lower limits of the distance Δm from the container's top to the door type frames can be determined by the following method:

Lower limit can be determined according to vertical deformation ranges of general test soil.

Upper limit can be determined by considering maximum deformation of elastic layer and plane decoupling layer, wherein the elastic layer is limited by irreversible deformation of the material, that is, elastic material exceeds the elastic boundary. The planar decoupling layer is limited by separation of decoupling component from the circular groove.

The third purpose of the disclosure is to provide the use of any aforementioned periodic structure for constant gravity shaking table or centrifuge shaking table.

The forth purpose of the disclosure is to provide the use of any aforementioned tri-axial decoupling motion containers for constant gravity shaking table or centrifuge shaking table.

The disclosure has the following beneficial effects:

(1) The tri-axial motion decoupling shaking table container can be used in the tri-axial shaking table test, wherein both the constant gravity shaking table test and the centrifuge shaking table test can use it. The specific model sizes and parameters can be determined according to corresponding test requirements. It is especially suitable for centrifuge tri-axial shaking table test, preferably suitable for centrifuge shaking table test with high centrifugal accelerations (N≥100).

(2) By setting decoupling components and lubricating grease for lubrication, the container can be deformed arbitrarily along horizontal directions, and the horizontal shear deformation of the test soil is almost unconstrained. So not only synchronization between the container and the test soil can be realized, but also horizontal interference between the container and the test soil can be avoided, and the compression wave is reduced. Lubricating grease can further reduce rolling friction between decoupling components and the side-confining layers, which can effectively reduce the extra force exerted by the container to the test soil. Besides, the container is made of light-weight high-strength materials, and the side-confining layer rings can be hollow structures, which can reduce total weight of the whole container and minimize lateral inertia force produced by the container weight to the test soil, so that extra forces exerted by the container to the test soil is almost zero. By setting elastic layers between adjacent two periodic structures, the container's vertical stiffness can be changed so that vertical stiffness of the container and the test soil can be adjusted consistently, ensuring that motions of the container and the test soil can be synchronous along vertical direction. The combination of plane decoupling layers and elastic layers can realize the coordinate motions of the container and the test soil. The interaction between the container and the test soil can be eliminated tri-axially, including the container's shear deformation excited along two horizontal directions and the tensile or compression deformation excited along vertical direction. The container does not produce additional force to the test soil and realizes motion decoupling of tri-axial vibration.

(3) The light-weight high-strength side-confining layers have enough stiffness, so the container is not easy to have lateral bulging deformation (bearing loads are mainly axial forces, while the bending moments are relatively small), which in turn let the test soil meet conditions of zero lateral deformation.

(4) By setting up double layer rubber films between the test soil and the container, the interference of the container's horizontal motions to vertical motion can be further relieved and the internal stress redistribution of the test soil can be avoided when compared with prototype sites. Rubber films contact the test soil and the container through friction, and rubber films' relative free sliding can be realized through filling the lubricating grease into double layer rubber films. The rubber films can't separate from the test soil and the container, thus can efficiently reduce the container's boundary effects.

(5) The tri-axial motion decoupling of shaking table containers can be better realized by the combination of periodic structures and double layer rubber films.

(6) The bottoms of door frames are connected with container bottom plate, which can be disassembled freely and protect the container in centrifuge shaking table test.

(7) For different types of soil samples, vertical deformation consistency can be satisfied as long as changing material properties of rubber layers, which is convenient and practical. For different types of soil samples, the ball bearings and regular polygon metal ring don't need re-selection, which are reusable, improving the container's applicability and saving materials.

Figure 1:
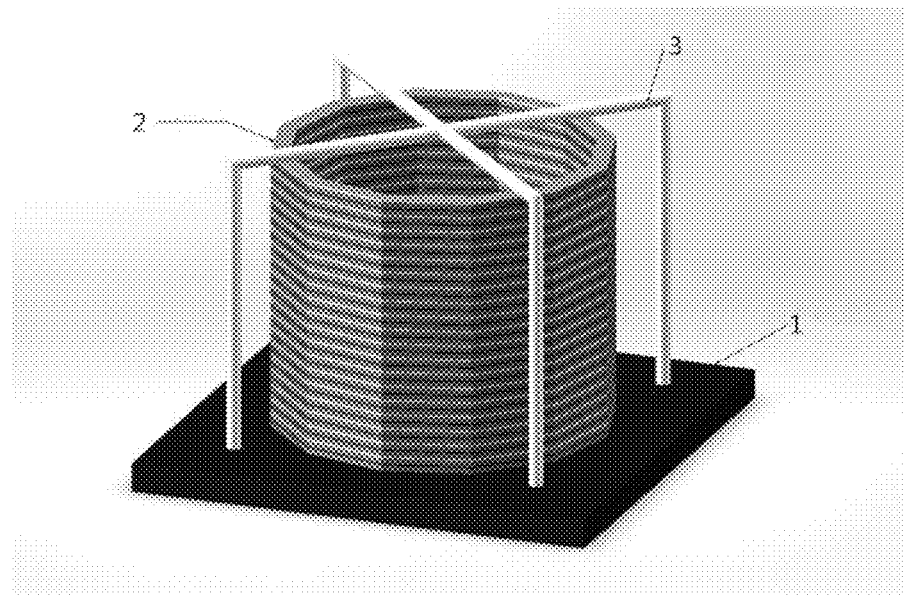
FIG. 1 is the three-dimensional schematic diagram of the tri-axial motion decoupling shaking table container.
Figure 2:
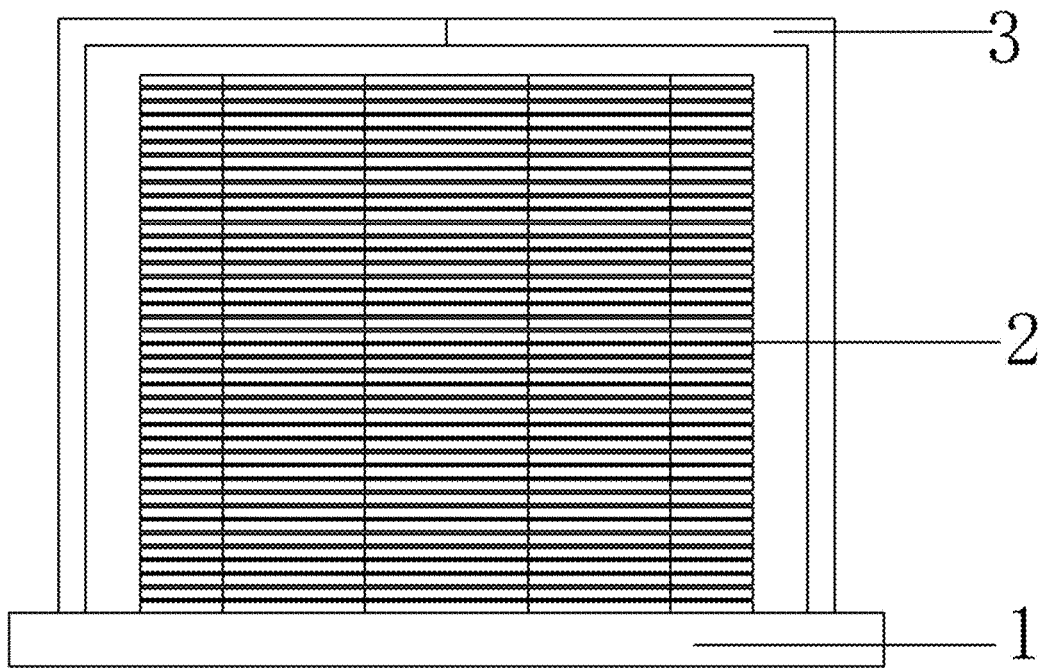
FIG. 2 is the elevation view of the tri-axial motion decoupling shaking table container.
Figure 3:
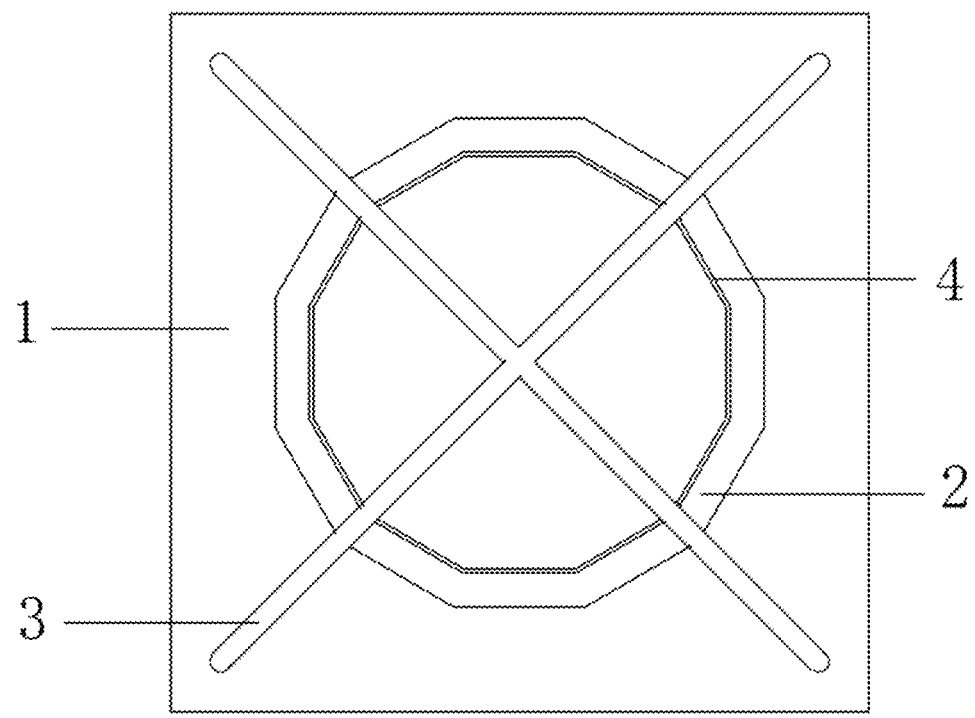
FIG. 3 is the vertical view of the tri-axial motion decoupling shaking table container.
Figure 4:
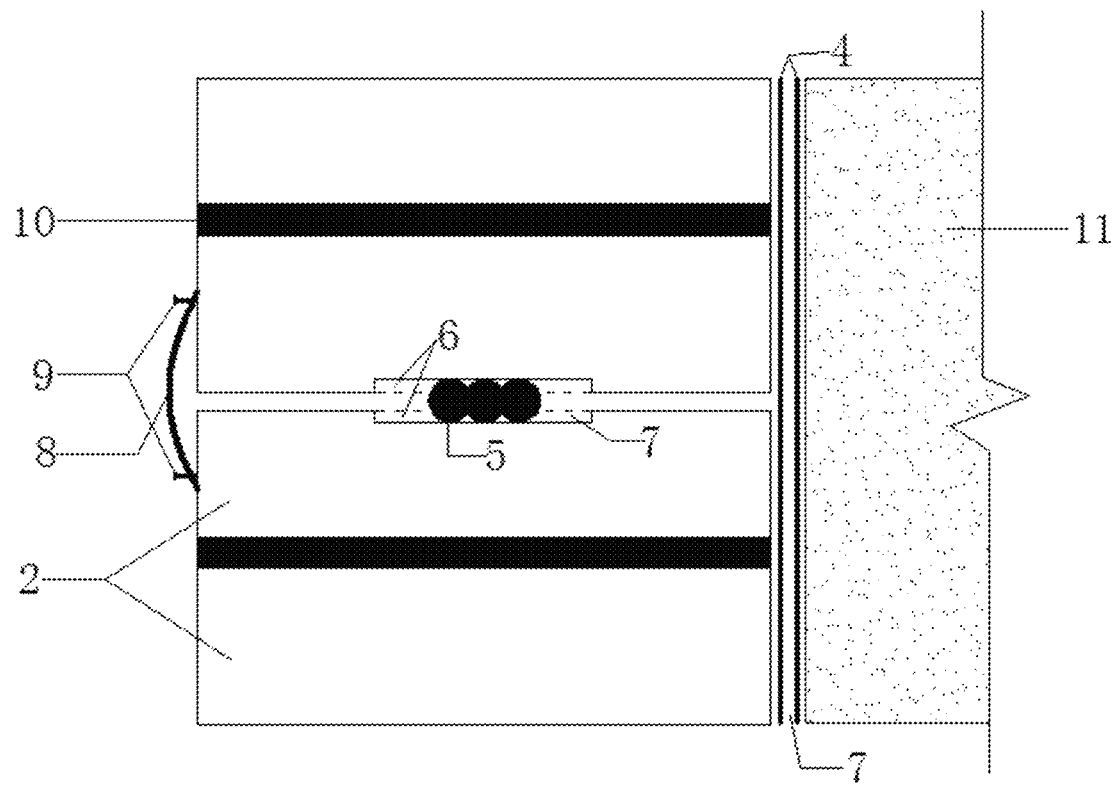
FIG. 4 is a schematic diagram of the periodic structure unit.
Figure 5:
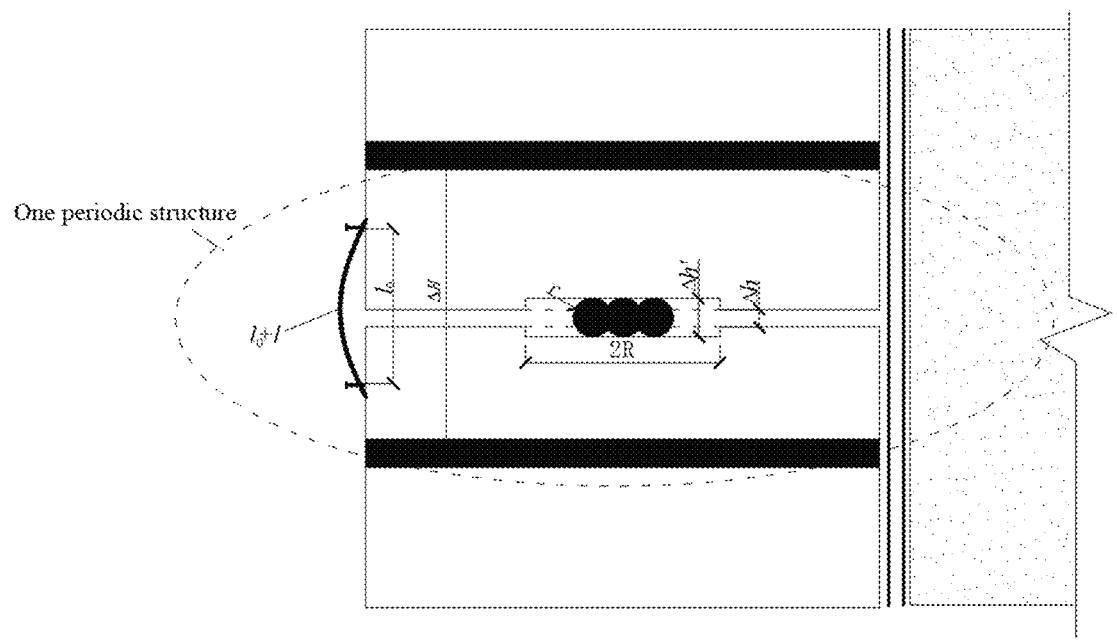
FIG. 5 is the dimension diagram of the periodic structure unit.
Figure 6:
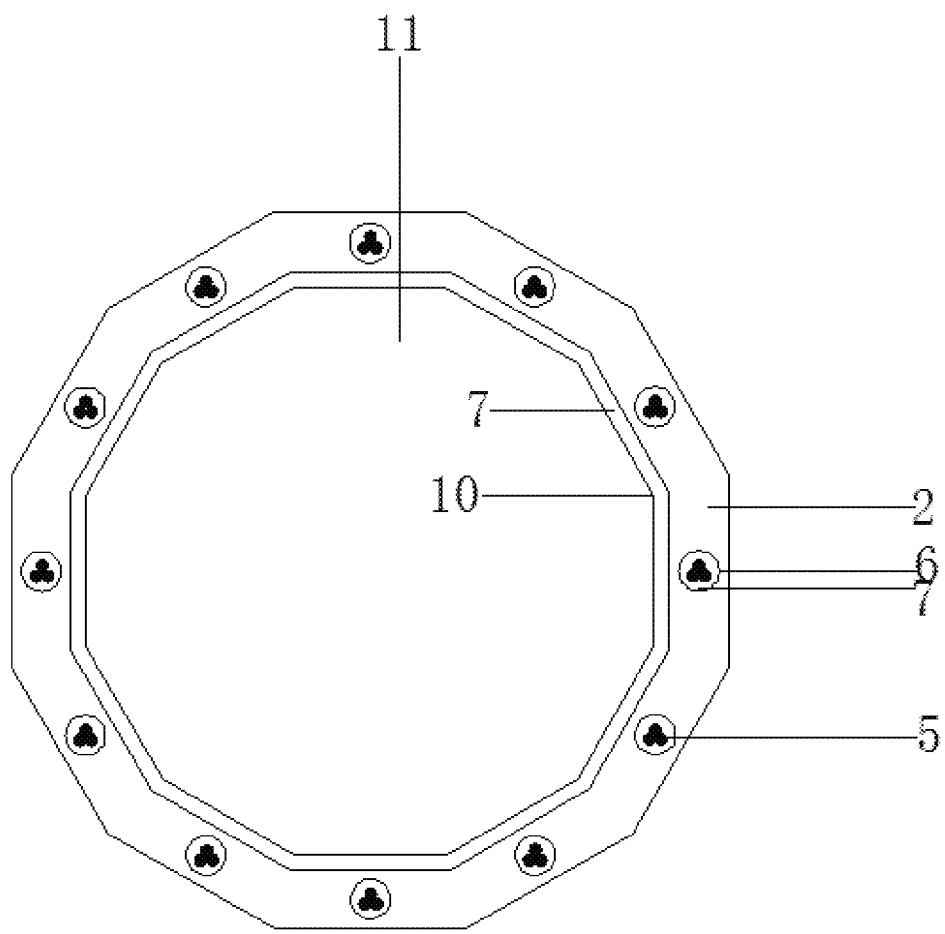
FIG. 6 is a plane schematic diagram of the planar decoupling layer of the periodic structure unit.
Figure 7:
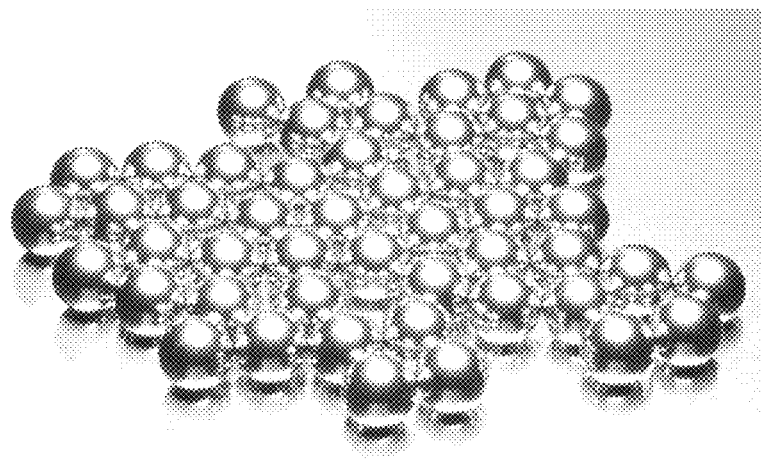
FIG. 7 is a schematic diagram of ball bearings.
Figure 8:
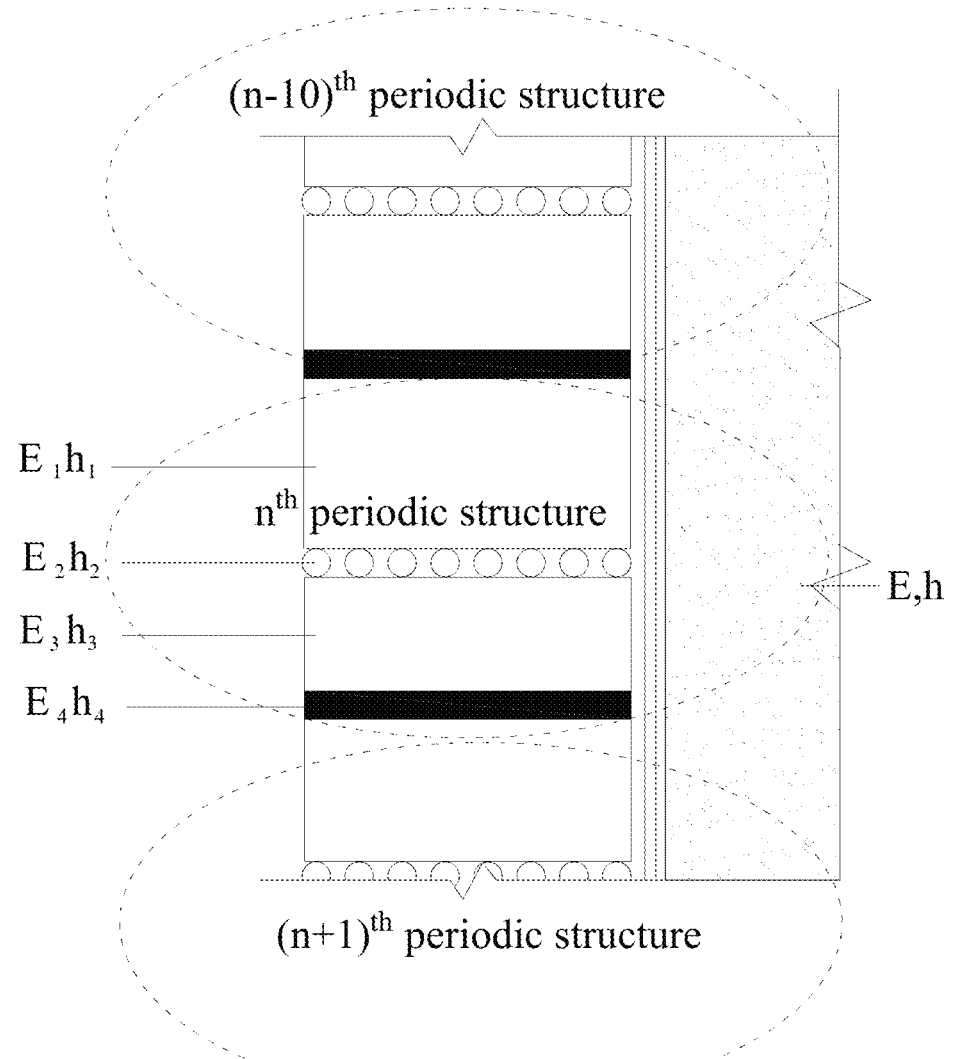
FIG. 8 is a schematic diagram of periodic structure.

As shown in FIGS. above, 1 indicates the container bottom plate, 2 indicates the regular polygon metal ring of twelve edges, 3 indicates limit protection door frame, 4 indicates double layer rubber films, 5 indicates ball bearings, 6 indicates circular grooves, 7 indicates lubricating grease, 8 indicates thin steel sheets, 9 indicates bolts, 10 indicates rubber layers, 11 indicates test soil.

The meanings of each parameters in FIGS. are as follows: $\Delta h$ is gap distance between regular polygon metal rings of adjacent periodic structures with twelve edges, $\Delta h'$ is the distance between upper surface of the circular grooves on the first side-confining layer and lower surface of the circular groove on the second side-confining layer, R is the radius of circular grooves, r is the radius of decoupling components, $l_0$ is the distance between bolt fixed points, $l_0+l$ is the length of thin steel sheet, elastic modulus of the first side-confining layer is $E_1$ and height is $h_1$, elastic modulus of the planar decoupling layer is $E_2$ and height is $h_2$, elastic modulus of the second side-confining layer is $E_3$ and height is $h_3$, elastic modulus is $E_4$ and height is $h_4$, compressive modulus of the soil is E and the distance between upper boundary of the test soil and elastic layer is h.

DETAILED DESCRIPTION OF THE PREFERRED EMBODIMENTS

The following implementation is only used to illustrate the present disclosure while isn't used to restrict the range of the present disclosure. Besides it should be understood that after reading the content which the present disclosure has proposed, this field's technicians can make various changes or modifications to the present disclosure. These equivalent forms are also included in the range that the present application's attached claims have restricted.

A tri-axial motion decoupling periodic structure in this the disclosure for shaking table containers is characterized in that the periodic structure is stacked (superimposed) together by n periodic structure units, and the periodic structure unit is formed orderly by superposition of the first side-confining layer, the planar decoupling layer, the second side-confining layer and the elastic layer, and n is a positive integer greater than or equal to 2. The first side-confining layer's cross-sectional shape is same as elastic layer, second side-confining layer and planar decoupling layer, while the material of first side-confining layer and the second side-confining layer can be same or different. So the periodic structure can be used to realize the tri-axial motion decoupling under earthquake motion conditions.

The planar decoupling layer comprises a plurality of symmetric distributed decoupling units, and a decoupling unit comprises decoupling components, lubricating grease and a circular groove, wherein the circular groove is used to realize free motion of decoupling components and limit maximum horizontal displacements. The decoupling components and lubricating grease can realize synchronous motion between the container and the test soil, and the decoupling unit can realize non-interference of the periodic structure unit's horizontal motions. The plurality of symmetric distributed decoupling units can realize horizontal vibration decoupling and ensure consistency of the interlayer shear strain between periodic structure units.

The planar decoupling layer connects the first side-confining layer and the second side-confining layer, on which there are a plurality of circular grooves with symmetrical distributions.

The elastic layer is used to change vertical stiffness of the container and to realize synchronous vertical motion between the container and the test soil.

The planar decoupling layer and the elastic layer are combined to realize decoupling of vertical and horizontal motions of the container and the test soil.

The decoupling units of each periodic structure unit's planar decoupling layer can be same or different.

In some embodiments, the lateral limit layers are regular polygon aluminum alloy rings of twelve edges, the decoupling component are steel ball bearings, the elastic layers are rubber layers, and the door frames function as limit protection. The abovementioned parts form the basic components of a tri-axial motion decoupling container for shaking table test.

A tri-axial motion decoupling container for shaking table test comprises the follows: container bottom plate 1, regular polygon metal ring of twelve edges 2, limit protection door frames 3, double layer rubber films 4, ball bearings 5, circular grooves 6, lubricating grease 7, thin steel sheets 8, bolts 9, rubber layers 10, and test soil 11. The periodic structure can be formed by orderly stacking regular polygon metal rings of twelve edges 2, ball bearings 5, the regular polygon metal rings of twelve edges 2, and rubber layers 10. The periodic structures are protected by thin steel sheets 8 with excess length, which are fixed by bolts 9. The container is formed by stacking periodic structure onto container bottom plate 1 from bottom to top. By setting ball bearings 5 between regular polygon metal rings of twelve edges 2, the container can deform freely along horizontal directions. Ball bearings 5 are placed in circular grooves 6 and lubricated with lubricating grease 7, the circular grooves 6 can limit horizontal displacements of the container. Vertical stiffness of the container can be changed by putting the selected rubber layer 10 in regular polygon metal rings of twelve edges 2. The container's vertical displacements can be limited by thin steel sheets 8 with excess length, which are fixed by bolts 9 onto adjacent regular polygon metal rings of twelve edges 2. The combination of plane decoupling layers and rubber layers can realize coordinate motions of the container and the test soil. The interaction between the container and the test soil can be eliminated tri-axially, including the container's shear deformation excited along two horizontal directions and tensile or compression deformation excited along vertical direction. The container does not produce additional force to the test soil and realizes motion decoupling of tri-axial vibration.

The double layer rubber films 4 are composed by two rubber films, which are filled with 7—lubricating grease such as silicone oil, and the unlubricated faces of rubber films are contacted with the container and 11—test soil respectively, so the boundary effects and horizontal motion's influence on vertical motion can both be reduced by relative free deformation of both rubber films. The tri-axial motion decoupling of shaking table containers can be better realized by the combination of periodic structures and double layer rubber films.

The top of the container is provided with cross shaped limit protection door frames 3, which are connected with the container bottom plate 1, so the vertical deformation of the container is limited.

The choice of material for the rubber layer 10 should be such as to satisfy the same vertical strain between the periodic structure and the test soil, that is $\overline{\varepsilon_{periodic structure}} = \varepsilon_{test\ soil}$, the following formulas can be used to calculate the rubber layer's elastic modulus and then the rubber layer material can be chosen.

$$\overline{\varepsilon_{periodic\ structure}} = \int_h^{h+h_1} \frac{kh}{E_1} dh + \int_{h+h_1}^{h+h_1+h_2} \frac{kh}{E_2} dh +$$
$$\int_{h+h_1+h_2}^{h+h_1+h_2+h_3} \frac{kh}{E_3} dh + \int_{h+h_1+h_2+h_3}^{h+h_1+h_2+h_3+h_4} \frac{kh}{E_4} dh$$

$$\varepsilon_{test\ soil} = \int_h^{h+h_1+h_2+h_3+h_4} \frac{kh}{E} dh$$

$$\overline{\varepsilon_{periodic\ structure}} = \varepsilon_{test\ soil}$$

Wherein, elastic modulus of the first side-confining layer is $E_1$ and height is $h_1$, elastic modulus of the planar decoupling layer is $E_2$ and height is $h_2$, elastic modulus of the second side-confining layer is $E_3$ and height is $h_3$, elastic modulus is $E_4$ and height is $h_4$, compressive modulus of the soil is E and the distance between upper boundary of the test soil and elastic layer is h. The vertical stress linearly increases with the test soil's depth, which can be expressed as kh, where k is a linear coefficient. Based on the aforementioned simple integral operations and the deformation equality of the container and the test soil, vertical elastic modulus of the elastic layer can be calculated according to the following parameters: the soil's compressive modulus, the elastic moduli and heights of two the regular polygon metal rings of twelve edges, the elastic modulus and height the plane decoupling layer, and the height of rubber layer. So the specific elastic layer material can be selected according to calculated elastic modulus.

The dimension of circular grooves can be determined according to maximum shear deformation: $\gamma_{max}=(R-r)/\Delta H$, wherein R is the radius of circular grooves, r is the radius of decoupling components, and $\Delta H$ is the distance between the centers of two adjacent periodic structure's elastic layers, $\gamma_{max}$ is the maximum shear deformation of the test soil at the periodic structure. A preliminary estimate of $\gamma_{max}$ can be obtained based on test soil's properties, then the dimension of circular groove can be reversed according to the dimension of selected ball bearings.

For thin steel sheets, excess length l can be determined by:

$$l=\max\{(R-r),(\Delta h'-\Delta h)\}$$

Wherein, $\Delta h'$ is the distance between upper surface of circular grooves on the first side-confining layer and the lower surface of the circular grooves on the second side-confining layer, the $\Delta h$ is gap distance between the first side-confining layer and the second side-confining layer, R is the radius of circular grooves, r is the radius of decoupling components. In order to be safer, excess length l of thin steel sheets can be multiplied by certain safety factor for the actual application, for example, take 1.1 for the safety factor.

The upper and lower limits of distance $\Delta m$ from the container's top to door frames can be determined by following methods:

Lower limit can be determined according to vertical deformation ranges of general test soil, which can be obtained by multiplying the test soil's height value by test soil's vertical seismic strain ranges by centrifugal accelerations.

Upper limit can be determined by considering maximum deformation of the elastic layer and the plane decoupling layer, wherein the elastic layer is limited by the irreversible deformation of the material, that is, the elastic material exceeds elastic boundary, and the planar decoupling layer is limited by separation of decoupling components from the circular grooves.

The followings are three examples of shaking table containers:

Embodiment 1

The first container is formed by stacking regular polygon periodic structures of twelve edges, of which the side length is 13.1 cm and the inscribed circle's radius is 50 cm. The periodic structures are made of light-weight and high-strength aluminum-magnesium alloy, and the container's overall height is 61 cm. The tri-axial shaking table container has a total of 10 periodic structures, and the height of each regular polygon aluminum-magnesium alloy ring of twelve edges is 25 mm. The adjacent periodic structures are connected by 10 mm thick special rubber and reinforced with pressure to form a whole, meanwhile the gap distance of adjacent regular polygon aluminum-magnesium alloy rings is 1 mm. There are 12 circular grooves forming at each side center of the regular polygon aluminum-magnesium alloy ring of twelve edges, and each circular groove is arranged with a steel ball bearing. The maximum displacement 2.5 mm is allowed between adjacent rings. The excess length of the thin steel sheet is 2 mm. The top of the container is provided with cross shaped door frames, whose bottom are connected with the container bottom plate to form limit protection. Besides, the double layer rubber films are used as a supplementary measure of vertical and horizontal decoupling.

Embodiment 2

The second container is formed by stacking circular periodic structures, of which the inner radius is 60 cm and outer radius is 62 cm. The periodic structures are made of light-weight high-strength boron-aluminum alloy, and the container's overall height is 51 cm. The tri-axial shaking table container has a total of 10 periodic structures, and the height of each circular boron-aluminum alloy ring is 20 mm. The adjacent periodic structures are connected by 10 mm thick special rubber and reinforced with pressure to form a whole, meanwhile the gap distance of adjacent circular boron-aluminum alloy rings is 1 mm. There are 16 circular grooves evenly forming at the center of the circular boron-aluminum alloy ring, and each circular groove is arranged with a steel ball bearing. The maximum displacement 2.5 mm is allowed between adjacent rings. The excess length of the thin steel sheet is 2 mm. The top of the container is provided with cross shaped door frames, whose bottom are connected with the container bottom plate to form limit protection. Besides, the double layer rubber films are used as a supplementary measure of vertical and horizontal decoupling.

Embodiment 3

The third container is formed by stacking regular polygon periodic structures of eight edges, of which the side length is 14.2 cm and the inscribed circle's radius is 45 cm. The periodic structures are made of high-strength carbon fiber filled with epoxy resin, and the container's overall height is 71 cm. The tri-axial shaking table container has a total of 10 periodic structure, and the height of high-strength carbon fiber ring of eight edges is 30 mm. The adjacent periodic structures are connected by 10 mm thick special rubber and reinforced with pressure to form a whole, meantime the gap distance of adjacent high-strength carbon fiber ring of eight edges is 1 mm. There are 8 circular grooves forming at each side center of the high-strength carbon fiber ring of eight edges, and each circular groove is arranged with a steel ball bearing. The maximum displacement 2.5 mm is allowed between adjacent rings. The excess length of the thin steel sheet is 1 mm. The top of the container is provided with cross shaped door frames, whose bottom are connected with the container bottom plate to form limit protection. Besides, the double layer rubber films are used as a supplementary measure of vertical and horizontal decoupling.

Motion coordination between the container and the test soil can be reflected by the deformations of the container and the test soil, which are monitored by sensors; in other words, tri-axial motion decoupling properties of the periodic structures can be detected. In particular, vertical deformation synchronization is reflected by deformations of the test soil and the container, which are measured by laser displacement sensors. Horizontal deformation synchronization is reflected by accelerations in middle of the test soil and along soil boundaries, which are measured by tri-axial accelerometers. If the container does not have good decoupling properties, the deviations in synchronous displacements and accelerations would be very big, namely the tri-axial vibration has caused serious mutual interference.

The tri-axial motion decoupling properties of the container are detected in centrifuge test with centrifugal accelerations of 20 g, 50 g and 100 g respectively. The test results show that during the environment of centrifuge tri-axial vibration, the vertical displacement deviations can be controlled within 10%, and the tri-axial acceleration deviations in the test soil between the model middle position and the interface with the container can be controlled within 10%. All the deviations are within allowable ranges, which shows good tri-axial decoupling effects. In the environment of constant gravity tri-axial vibration, the container has better decoupling characteristics, with deviations of displacements and tri-axial accelerations can be controlled within 5%.

What is claimed is:

1. A tri-axial motion decoupling periodic structure for a shaking table container, comprising: n periodic structure units sequentially superimposed together, wherein n is a positive integer greater than or equal to 2; wherein the periodic structure unit comprises a first side-confining layer, a planar decoupling layer, a second side-confining layer, and an elastic layer sequentially stacked together; wherein the cross-sectional shapes of the first side-confining layer, the elastic layer, the second side-confining layer, and the planar decoupling layer are the same;

wherein the planar decoupling layer comprises a plurality of symmetrically distributed decoupling units, the decoupling unit comprising a decoupling component, lubricating grease and a circular groove, wherein the circular groove is configured to allow a free motion of the decoupling unit and to limit maximum horizontal displacements of the decoupling unit; wherein the decoupling component and lubricating grease are configured to realize a synchronous motion between the container and a test soil, and the decoupling units are configured to realize non-interference between the periodic structure unit's horizontal motions; wherein the plurality of symmetrically distributed decoupling units is configured to implement horizontal vibration decoupling;

wherein the planar decoupling layer connects the first side-confining layer and the second side-confining layer, on which there are a plurality of the circular grooves with symmetrical distributions; and wherein the elastic layer is used to change the vertical stiffness of the container and to realize a synchronous vertical motion between the container and the test soil.

2. The tri-axial motion decoupling periodic structure of claim 1, wherein the periodic structure is configured to realize the tri-axial motion decoupling of the container of a centrifuge shaking table.

3. The tri-axial motion decoupling periodic structure of claim 2, wherein a centrifugal acceleration factor N of the shaking table is greater than or equal to 20.

4. The tri-axial motion decoupling periodic structure of claim 1, wherein the material density of the side-confining layer is less than or equal to 7.85 g/cm$^3$, and the elastic modulus is greater than or equal to 40 kN/mm$^2$; the material of the side-confining layer is aluminum alloy.

5. The tri-axial motion decoupling periodic structure of claim 1, wherein a shape of the said side-confining layer is circular or regular polygon; the number of regular polygon's edges is greater than or equal to 2m, m is a positive integer and m is greater than or equal to 4.

6. The tri-axial motion decoupling periodic structure of claim 1, wherein the said side-confining layer is a metal ring.

7. The tri-axial motion decoupling periodic structure of claim 1, wherein a strain of the periodic structure is equal to a strain of the test soil and satisfies the following formula:

$$\overline{\varepsilon_{periodic\ structure}} = \int_{h}^{h+h_1} \frac{kh}{E_1} dh + \int_{h+h_1}^{h+h_1+h_2} \frac{kh}{E_2} dh + \int_{h+h_1+h_2}^{h+h_1+h_2+h_3} \frac{kh}{E_3} dh + \int_{h+h_1+h_2+h_3}^{h+h_1+h_2+h_3+h_4} \frac{kh}{E_4} dh$$

$$\varepsilon_{test\ soil} = \int_{h}^{h+h_1+h_2+h_3+h_4} \frac{kh}{E} dh$$

$$\overline{\varepsilon_{periodic\ structure}} = \varepsilon_{test\ soil}$$

wherein $\overline{\varepsilon_{periodic\ structure}}$ is the strain of the periodic structure, $\varepsilon_{test\ soil}$ is the strain of the test soil; an elastic modulus of the first side-confining layer is $E_1$ and height of the first side-confining layer is $h_1$, an elastic modulus of the planar decoupling layer is $E_2$ and height of the planar decoupling layer is $h_2$, an elastic modulus of the second side-confining layer is $E_3$ and height of the second side-confining layer is $h_3$, an elastic modulus of the elastic layer is $E_4$ and height of the elastic layer is $h_3$, a compressive modulus of the test soil is E, a distance between the upper boundary of the test soil and the elastic layer is h, a vertical stress linearly increases with the depth of the test soil, the vertical stress can be expressed as kh, wherein k is a linear coefficient.

8. The tri-axial motion decoupling periodic structure of claim 1, wherein the elastic layer's material is rubber.

9. The tri-axial motion decoupling periodic structure of claim 1, wherein an elastic modulus of decoupling component material is greater than or equal to 160 kN/mm$^2$; the decoupling component material is steel or stainless steel.

10. The tri-axial motion decoupling periodic structure of claim 1, wherein a shape of the decoupling components is circular.

11. The tri-axial motion decoupling periodic structure of claim 1, wherein the decoupling components are ball bearings.

12. The tri-axial motion decoupling periodic structure of claim 10, wherein dimensions of the circular grooves and the decoupling components is determined according to the maximum shear deformation: $Y_{max}=(R-r)/\Delta H$, where R is a radius of the circular grooves, r is a radius of the decoupling components, and $\Delta H$ is a distance between centers of two adjacent periodic structure's elastic layers, $Y_{max}$ is the maximum shear deformation of the test soil at the periodic structure.

13. The tri-axial motion decoupling periodic structure of claim 1, wherein the quantity of the decoupling components is equal or more than one.

14. The tri-axial motion decoupling periodic structure of claim 1, wherein the quantity of the circular grooves is at least 3.

15. The tri-axial motion decoupling periodic structure of claim 1, wherein the cross-sectional shape of the periodic structure is a circle or regular polygon; the number of regular polygon's edges is greater than or equal to 2m, m is a positive integer greater than or equal to 4.

16. The tri-axial motion decoupling periodic structure of claim 1, wherein the periodic structure unit further comprises at least two limiting devices, wherein the limiting devices are configured to realize vertical limit protection for the planar decoupling layer, preventing the vertical relative displacements between the first side-confining layer and the second side-confining layer from being too large that causes separation.

* * * * *